US006829393B2

(12) United States Patent  
Jansson (10) Patent No.: US 6,829,393 B2
(45) Date of Patent: Dec. 7, 2004

(54) METHOD, PROGRAM AND APPARATUS FOR EFFICIENTLY REMOVING STRAY-FLUX EFFECTS BY SELECTED-ORDINATE IMAGE PROCESSING

(76) Inventor: Peter Allan Jansson, 19 Arthur Dr., Hockessin, DE (US) 19707

( * ) Notice: Subject to any disclaimer, the term of this patent is extended or adjusted under 35 U.S.C. 154(b) by 612 days.

(21) Appl. No.: 09/956,684

(22) Filed: Sep. 20, 2001

(65) Prior Publication Data

US 2003/0053712 A1 Mar. 20, 2003

(51) Int. Cl.[7] .............................................. G06K 9/40
(52) U.S. Cl. .................... 382/275; 382/260; 382/274; 382/252; 358/3.26; 358/3.27; 358/463
(58) Field of Search ................................ 382/252, 260, 382/274, 275, 263; 358/3.26, 3.27, 520, 463

(56) References Cited

U.S. PATENT DOCUMENTS

| | | | | |
|---|---|---|---|---|
| 4,490,744 A | * | 12/1984 | Levine | 348/249 |
| 4,729,030 A | * | 3/1988 | Glenn | 348/770 |
| 4,752,735 A | | 6/1988 | Onodera et al. | |
| 5,153,926 A | | 10/1992 | Jansson et al. | |
| 5,631,705 A | * | 5/1997 | Tani | 348/314 |
| 6,173,087 B1 | * | 1/2001 | Kumar et al. | 382/284 |
| 6,181,270 B1 | * | 1/2001 | Dwyer | 342/25 R |

OTHER PUBLICATIONS

Peter A. Jansson & Robert P. Breault, *Correcting Color–Measurement Error Caused by Stray Light in Image Scanners* The Sixth Color Imaging Conference: Color Science, Systems and Applications, pp. 69–73.
Peter A. Jansson, *Deconvolution of Images and Spectra*. Second Edition, 1997. pp. 25 and 26.

Peter A. Jansson, *Deconvolution of Images and Spectra*. Second Edition, 1997. pp. 84–90.
Kenneth R. Castleman. *Digital Image Processing*. Prentice Hall, 1996. pp. 320–321.
Deane B. Judd & Gunter Wyszecki. *Color in Business Science and Industry*. Third Edition. John Wiley & Sons, New York, pp. 149, 151 and 152.
Daniel L. Lau & Gonzalo R. Arce. *Modern Digital Halftoning*. Marcel Dekker, Inc., New York 2001, pp. 19, 21, 95, and 96.
E. J. Borowski with the Assistance of J. F. Bowers, A. Robertson and M. McQuillan. *The Harper Collins Dictionary of Mathematics*. HarperPerennial, 1991. p. 339.

* cited by examiner

Primary Examiner—Bhavesh M. Mehta
Assistant Examiner—Yosef Kassa (57) ABSTRACT

The present invention is directed toward correcting a corrupted image of an object to remove the effects of smearing or misdirected flux in the image, wherein the image comprises one or more dimensions and has a plurality of image elements. The method of the present invention comprises the steps of:

a) sampling portions of the image of the object at unequal intervals, the intervals being selected to effect an implicit weighting of the samples corresponding to a predetermined weighting function;

b) summing the implicitly weighted samples to create an approximation to a weighted integral;

c) repeating steps a)–b) to compute weighted integrals associated with each of the plurality of image elements thereby to obtain a correction to the image.

The present invention is also implemented as a computer readable medium for controlling a computer to implement the steps of the method and in apparatus form.

29 Claims, 6 Drawing Sheets

ALGORITHM TO GENERATE SELECTED-ORDINATE COORDINATES

DO FOR ALL ISOPLANATIC PATCHES

> DO FOR A REPRESENTATIVE PIXEL IN EACH PATCH
>
>> PLACE PIXEL COORDINATE LOCATION OF WEIGHT-FUNCTION MAXIMUM ON SELECTED-ORDINATE LIST
>>
>> DO FOR MONOTONICALLY INCREASING REPRESENATATIVE-PATCH-ASSOCIATED WEIGHT FRACTIONS UNTIL FULL WEIGHT IS REALIZED
>>
>>> DO FOR ALL IMAGE PIXELS
>>>
>>>> COMPARE LOCAL SAMPLE DENSITY WITH FRACTION OF REPRESENTATIVE-PATCH ASSOCIATED WEIGHT
>>>>
>>>> IF LOCAL SAMPLE DENSITY IS INADEQUATE & NO SAMPLE HAS BEEN PLACED AT THIS LOCATION
>>>>
>>>>> ADD THIS PIXEL'S COORDINATE LOCATION TO SELECTED-ORDINATE LIST FOR THIS PATCH
>
> ALL ORDINATES FOR THIS PATCH HAVE BEEN SELECTED
>
> DETERMINE SCALE FACTOR NEEDED TO RELATE SELECTED IMAGE PIXEL SUM TO STRAY-LIGHT ESTIMATE

Figure 2

STRAY-LIGHT CORRECTION ALGORITHM

DO FOR ALL ISOPLANATIC PATCHES

DO FOR ALL PIXELS IN EACH PATCH

CLEAR STRAY-LIGHT ACCUMULATOR

DO FOR ALL PATCH SELECTED-ORDINATE COORDINATES          ADD PATCH-SPECIFIC OFFSET TO SELECTED-ORDINATE COORDINATE          ADD TO ACCUMULATOR THE PIXEL VALUE AT THE OFFSET-CORRECTED COORDINATE       SCALE ACCUMULATED STRAY-LIGHT SUM       SUBTRACT STRAY-LIGHT ESTIMATE FROM IMAGE PIXEL

METHOD, PROGRAM AND APPARATUS FOR EFFICIENTLY REMOVING STRAY-FLUX EFFECTS BY SELECTED-ORDINATE IMAGE PROCESSING

BACKGROUND OF THE INVENTION

The present invention is directed to a method, program and apparatus for removing stray-flux effects in an image.

All imaging systems are victimized by phenomena that misdirect a small portion of the entering flux to undesired locations in the image. The term "imaging systems" as used herein includes, for example, optical systems, x-ray systems, and computerized tomography systems. Other systems that do not employ the directional passage of flux, such as magnetic resonance imaging systems, also fall within the term "imaging systems". Depending on the type of imaging system, the "image" may have a single dimension (a linear image), two dimensions (a planar image), three dimensions (a volume image), or more dimensions (a hyper image). In the most general sense the misdirected flux may be termed "stray-flux", although in the context of different systems, it is known by different terms.

Optical imaging systems are victimized by phenomena that misdirect a small portion of the entering light flux to undesired locations in the image plane. Among other possible causes, these phenomena include: 1) Fresnel reflection from optical-element surfaces, 2) diffraction at aperture edges, 3) scattering from air bubbles in transparent glass or plastic lens elements, 4) scattering from surface imperfections on lens elements, and 5) scattering from dust or other particles. The misdirected flux, which is called by the terms "stray light", "lens flare", "veiling glare", and by other names, degrades both the contrast and the photometric accuracy of the image. For example, in photography, back-lighted scenes such as portraits that contain a darker foreground object, suffer from poor contrast and reduced detail of the foreground object.

Perhaps less known and appreciated is the effect that "stray light" has on color accuracy of an image. P. A. Jansson and R. P. Breault, in "Correcting Color Measurement Error Caused by Stray Light in Image Scanners" published in Proceedings of The Sixth Color Imaging Conference: Color Science Systems and Applications, 1998, Society of Image Science and Technology, referred to a traditional simple manipulation of offset and gain, or contrast, that can lessen subjective objections to stray-light contaminated images. These manipulations, however, do not correct the underlying flaw in the image and do, in fact, introduce additional error.

U.S. Pat. No. 5,153,926 (Jansson et al.), assigned to the assignee of the present invention, describes various embodiments of a method to remove the stray-light effect from images. This method demands significant amounts of computation which might inhibit application within an image acquisition apparatus, such as a digital camera.

The method of the present invention, however, may be implemented in relatively simple apparatus, such as one or more digital-logic integrated circuits within a digital camera, and can quickly and inexpensively correct images that have been degraded by stray light.

Figure 1:
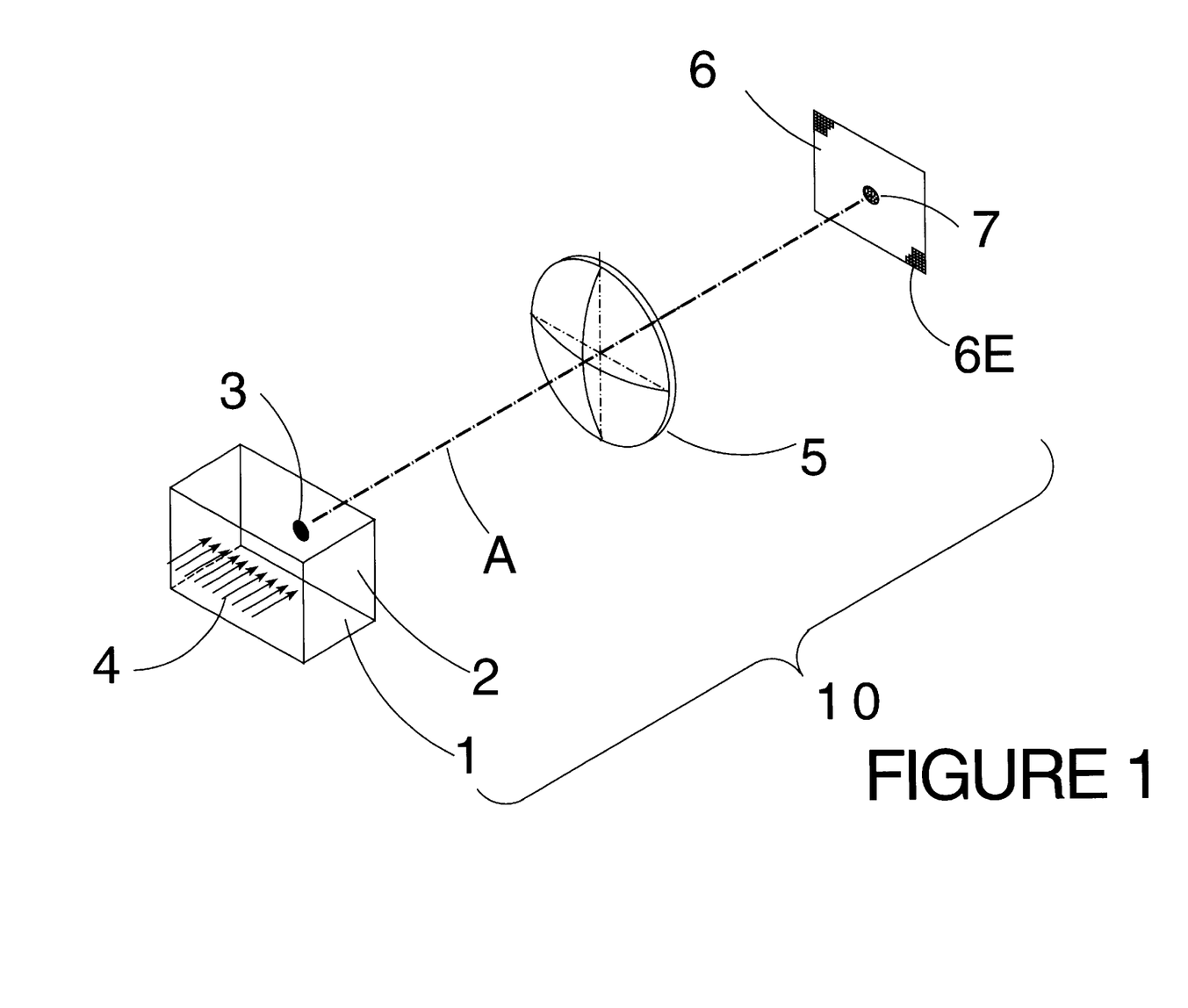
FIG. 1 shows an image arrangement which illustrates the effect of stray light on an image.

Magnitudes of the Stray Flux Effect The importance of the stray-flux effect in general and the stray-light effect in particular may appreciated from the following discussion of the magnitude of the effect of stray light on an optical imaging system. In an image arrangement 10 as shown in FIG. 1, a transparent mask 2 having an opaque spot 3 may be placed on a light-box 1 having a source of uniform diffuse illumination 4. A lens 5 is then used to image this back-illuminated spot 3 and its surround onto a target 6 comprised of a charge-couple-device (CCD) array of photodetector elements 6E, such as that now found in a digital camera. This arrangement creates an opportunity for light from the surrounding diffuse source 4 to stray into the center of the spot 7 imaged on the target 6. An opaque spot 3 having a lateral dimension of 12 percent of the surrounding field of view thus covers about 1.44% of the image area. An example of an implementation of the image arrangement 10 has shown that the center of such an opaque spot 7 image on the target plane 6, that should receive no light flux, actually receives light flux that corresponds to about 2% of the adjacent surround. An idealized densitometer should indicate infinite (or indeterminate) optical density at the center of the spot in the absence of the stray flux. However, the 2% stray-contaminated data obtained from this imaging system results in an erroneous optical density value of D=log (1.0/0.02) ≈1.7.

Area-imaging systems collect light from all points in the image in parallel, in contrast to scanning imaging systems that collect light from each point in the image serially. From the above example, it may be appreciated that area-imaging optical systems have limited use when applied to the measurement of optical densities. Best practice in optical density measurement calls for physically restricting the number of paths accessible to stray flux by using apertures, masks, baffles, special coatings and other techniques known to optical designers.

Scanning methods that image a scene in a point-by-point manner can overcome the inaccuracy of single-exposure entire-image parallel detection. The serial acquisition of the image by mechanical scanning methods, however, is impractical for many applications, especially photography. The need to place an aperture or mask close to the object plane imposes another unacceptable physical limitation for photography. The greatly increased exposure time owing to loss of parallel detection further imposes an unacceptable time limitation for photography. A photography camera requires a degree of separation between the object and the optics/detector system and requires parallel image detection to be practical.

Color Accuracy in Photography and Imaging Colorimetry P. A. Jansson and R. P. Breault, in the earlier-cited publication consider the image arrangement of FIG. 1, in a situation where a colored image spot is surrounded by a region having a different color, to determine how the color at the center of such a spot is affected by stray light from its surround. The perceptually uniform CIE color space denoted by the L*a*b* coordinate system is employed. In this system a difference value of about 1.0 is considered a just-noticeable-difference to a typical human observer. A blue spot having 5% contamination of green from a surround is shown to exhibit a color error of $\Delta E_{L^*a^*b^*}$=8.94. Here the blue was specified to have the L*a*b* coordinates (10, 10, 30) and the green surround had L*a*b* coordinates (10, 30, 10). This shift of nearly nine just-noticeable-difference units, however, was small compared to the result computed when more saturated values of blue, having L*a*b* coordinates (6.5, 2.5, 40), and green, having L*a*b* coordinates (6.5, 40, 2.5), were used, even with a much lower contamination level of 2%. In this case, the color error was gross, giving $\Delta E_{L^*a^*b^*}$=15.07. Similarly, in a realistic black and white image, they determined that a 4% contamination of a black spot having 5% reflectance resulted in an error of $\Delta E_{L^*a^*b^*}$= 9.09.

Earlier-cited U.S. Pat. No. 5,153,926 may be applied to the removal of stray-light effects from scanned images acquired by densitometers, cameras, microscopes, telescopes and other optical imaging systems. The method of this patent contemplates computations in both the Fourier and spatial domains. They require the concept of a full point-spread function (PSF) that characterizes the redistribution of light flux in the image plane occasioned by the presence of scattering phenomena and other stray-light-producing effects in the optical system. Characterization of stray-light by a point-spread function is not typically done because it describes the spreading of flux over large distances of image coordinate. This contrasts with common usage in which the point-spread function incorporates primarily diffraction and geometrical-optics aberrations. Only the central core of a camera's full point-spread function would correspond to the more traditional point-spread function.

However, the following description considers the point-spread function to provide for replication of an object with added stray-light effects only. Moreover, the stray light distribution is typically shift-variant. A single convolution is not usually adequate to describe stray-light contamination over a complete image. Accordingly, imaging in a digital camera is described by specifying all of the image flux i (x, y) received by a rectangular planar image detector having surface spatial coordinates x and y:

$$i(x, y) = \int\int s(x, y; x', y') o(x', y') dx' dy'. \quad (1)$$

In this equation, x' and y' are the two-dimensional spatial coordinates of a planar object o (x', y') that is imaged onto the detector, and s (x, y; x', y') is the point-spread function that describes replication of the object with only superimposed stray-light effects, but no additional corruption. The object distribution o (x', y') according to the present definition therefore may exhibit the other effects typical of an imperfect imaging system, such as degraded resolution owing to diffraction and geometrical aberrations.

The present method also assumes that all of the flux arriving at image i(x, y) originates within the bounds of the object that map directly to the rectangular bounds of the detector, so the limits of the integral are specified by these object bounds.

Jansson and Breault, in the previously cited publication, had shown that, because the character of point spread functions, such as s (x, y; x', y'), necessarily vary with the wavelength of light, both the imaging-system description and stray-light correction methods need to consider this variation in order to rigorously correct color images. The present method, in order to simplify both camera description and image correction, considers the CIE standard-observer $\bar{y}$ and $\bar{z}$ functions as each describing separate monochromatic responses with wavelengths corresponding to the peaks of these functions, respectively. Following the same reasoning strictly, the $\bar{x}$ function would require summing responses at the two wavelengths that correspond to its two peaks. However, color cameras typically employ detectors having a single-peak wavelength response. For clarity, notation of wavelength dependencies may be suppressed, while noting that required computations can be replicated at numerous multiple wavelengths for completeness, or at detector/receptor response peaks as a practical approximation.

Rigorous correction of image i (x, y) for stray-light effects requires solving Equation (1) above for object spatial distribution o (x', y'). Problems similar to this one, but in which s (x, y, x',y') is shift invariant, so that s (x, y; x', y') can be simplified as s (x−x', y−y'), call for deconvolution because Equation (1) would then contain a two-dimensional convolution, i.e., $$i(x, y) = \int\int s(x-y; x'-y') o(x', y') dx' dy'. \quad (2)$$

It is typically difficult to solve such problems involving real-world data inputs because they are usually ill-posed. By this it is meant that they either have no solution, have numerous solutions but offer no practical means to distinguish amongst them, or have a solution that varies radically or discontinuously with small changes in data i (x, y). It might be expected that the present shift-variant problem would be similar. However, this turns out not to be the case, for reasons that become apparent when the discrete version of Equation (1) is considered.

Consider then the matrix equation $$i = s\,o \quad (3)$$

that captures the sampled version of the problem, the column matrices i and o corresponding to i (x, y) and o (x', y'), respectively, and the square matrix s to s (x, y; x', y'). The double-variable x and y spatial dependencies of i (x, y) and o (x', y') collapse neatly to the single variable arguments required by the matrix description via lexicographic ordering of object and image planes within their bounds. See E. J. Borowski and J. M. Borwein, The Harper Collins Dictionary of Mathematics, Harper Perennial, New York, 1991, p. 339. Accordingly, the dimensions of matrices i and o are given by m×n, where m is the number of samples across the width of object o (x, y) and image i (x, y), and n is the number of samples along their respective heights. Matrix s then has dimensions N×N, where N=m×n.

One method of solving for vector o calls for iterations of the equation $$\hat{o}^{(k+1)} = \hat{o}^{(k)} + (i - s\hat{o}^{(k)}), \quad (4)$$

where k is the sequence number of the approximate solution, $\hat{o}^{(k)}$ is the $k^{th}$ estimate of the uncontaminated object and i is typically taken as $\hat{o}^{(0)}$. For the shift-invariant case involving discrete convolution this is called van Cittert's method. It has been identified as a special case of the Jacobi method of solving a set of linear equations, which in turn is applicable to the more general shift-invariant case applicable here. See P. A. Jansson, "Traditional Linear Deconvolution Methods," In Deconvolution of Images and Spectra, P. A. Jansson, ed., Academic Press, New York, 1996, p. 85–89.

In order to show that the solution to Equation (3) is not ill-posed, consider some specific features of s. In particular, let the PSF of a perfect camera, devoid of stray-light contamination, be denoted by $S_P=I$, where I is the identity matrix. The stray-light component may be characterized by a matrix $S_D$, the sampled version of an equivalent continuous function $s_D(x, y; x', y')$ so that $$s = s_P + s_D. \quad (5)$$

Because the present concern is primarily with stray light, either of three assumptions can be made: (1) that imaging-aperture diffraction and geometrical aberrations are negligibly small; (2) that aberrations are spatially localized well enough to be contained within the diagonal elements of the matrix $s_P$, or (3) that such effects are already incorporated in object distribution described by vector o. Any of the three assumptions leads to the same mathematical solution. However, they differ in their influence on how the solution must be interpreted and used. In the case of the third assumption, even a perfect solution will yield an object estimate ô bearing the effects of an otherwise imperfect imaging system. Accordingly, the present method corrects for neither airy-disk-like diffraction owing to a finite lens aperture nor for lens aberrations.

Note that in the foregoing it has also been assumed that the scale of the object and image is such that a value of unity results along the diagonal. This assumption is necessary for the results that follow. Furthermore, the individual sums along all rows and columns necessarily exceed unity owing to the presence of stray light:

$$\Sigma_i[s]_{ij}>1 \text{ for all } j, \text{ and } \Sigma_j[s]_{ij}>1, \text{ for } i. \tag{5A}$$

Consider the first iteration solution obtained by substituting the starting estimate $\hat{o}^{(0)}=i$ into Equation (4):

$$\hat{o}^{(1)} = i + (i - si) \tag{6}$$
$$= (s_P o + s_D o) + [(s_P o + s_D o) - s_P s_P o - 2 s_P s_D o - s_D s_D o].$$

Noting that $s_P = I$, terms may be collected, thereby yielding $$\hat{o}^{(1)} = o - s_D s_D o. \tag{7}$$

This is an especially interesting result, a serendipitous consequence of the manner in which $s_P$ is normalized. The first iteration object estimate is the object itself, in error by merely the quantity $-s_D s_D o$. This quantity is small because the stray-light portion of a digital-camera image is small compared to the properly imaged portion so that $$\Sigma_j[s_D]_{ij} \ll \Sigma_j[s_P]_{ij}. \tag{8}$$

This result obtains unless, of course, the camera's lens is grossly contaminated.

As seen above, a useful approximation to the uncontaminated object has been obtained by only one cycle of an otherwise iterative computation, this cycle involving a single matrix product:

$$\hat{o}^{(1)} = 2i - si \tag{9}$$
$$= i - s_D i.$$

In order to correct the image for stray-light contamination to good approximation, subtraction from the image of a term comprising the convolution of the image with the point-spread function stray-light component may be performed. Jansson and Breault, cited above, used a similar method to correct one-dimensional images for simulated stray light, yielding excellent results in the case where the PSF was characterized by a hyperbolically decreasing shift-invariant stray-light contribution superimposed on a "perfect-imaging" narrow central core.

Even though the above simplification has greatly reduced the potential computational load, it's direct extension to two-dimensional images nevertheless requires a large amount of computation if the sums are computed directly in the spatial domain. Specifically, an N by N image would require $N^4$ multiply-and-add pairs of operations, or $2N^4$ operations altogether.

If the point-spread function were shift invariant, the computation would involve a convolution that could be accomplished in the Fourier domain. If it is assumed that N is power of 2, a one-dimensional FFT of a single image line would require $5 N^2 \log_2 N$ operations. See P. A. Jansson, "Convolution and Related Concepts," in Deconvolution of Images and Spectra, P. A. Jansson, ed., Academic Press, 1996, p. 25. The 2-D transform then would require 2N times that number, or $10 N^2 \log_2 N$ operations.

One transform would be required to convert i to the transform domain, where it would be multiplied by the stray-light transfer-function (2i–s). This transfer function would already be in place, having been previously transformed from spatial-image space and available for multiple uses. A second transform would take the product back to the spatial domain. Thus the convolution involved in correcting a single image would cost two transform operations plus 6 $N^2$ multiplications in the transform domain, or $N^2$ (6+20 $\log_2$ N) operations altogether. However, it is already known that $s_D$ (x, y; x', y') is not shift-invariant. The correction can still be carried out via convolution by breaking the image into numerous small patches over which s (x, y; x', y') does not vary significantly, so-called isoplanatic patches. Note that, although the image data require transformation only once, convolution-theorem multiplication and inverse transformation must be carried out for all the patches. If it is assumed the patches are M×M pixel squares, the total number of operations needed becomes $$N^2\{10(1+(N/M)^2)\log_2 N+6 (N/M)^2\} \approx (N^4/M^2)(10 \log_2 N+6). \tag{9A}$$

This too imposes a large computational burden and requires computer code having increased complexity. Before introducing a preferred method of reducing this burden and complexity, it is appropriate to introduce a method to apply traditional multi-resolution approaches to efficiently compute the stray-light correction.

Image Pyramids It is well known that much computation can be saved in processing and analyzing images by operating on reduced-sample-density images in which each pixel is the composite, for example, the average, of a group of pixels. See K. R. Castleman, Digital Image Processing, Prentice-Hall, 1996, p. 320. Once the rough features of the analysis have been obtained on the reduced resolution image, it can be refined by reference to the fully sampled original. To this end, it is even possible to compute a hierarchical sequence of images to accomplish a given computational goal in stages. For example, consider a so-called pyramid of images in which each successively smaller (i.e., higher on the pyramid) image layer contains pixels corresponding to two-pixel by two-pixel square regions of the preceding image. Operating on just the first reduced-sample version of the original would result in a four-fold computational savings. Storing a complete pyramid of such images requires only $N^2+(N/2)^2+(N/4)^2+ \ldots +1$ image pixel locations.

The effect that such a sampling method has on the stray-light-correction computation may be considered. First a pyramid may be computed from the original image data i (x, y). In correcting pixels where the $s_D$ (x, y; x', y') varies rapidly, near the central core, data from the fully-sampled image would be used. Farther from the core, $s_D$ (x, y; x', y') varies more slowly with distance. Pixels from a more coarsely sampled image in the pyramid may be employed to form the products needed, using the weights from this portion of $s_D$ (x, y; x'y'). Ideally an appropriate level from the pyramid could be chosen such that the error contributions from all the samples would be about comparable. Depending on the specifics of the $s_D$ (x, y; x', y') and of the computational accuracy required, much computation can be saved via this method. The computational bookkeeping required to implement the method, however, could be substantial.

The idea of varying the sample density leads to yet another approach. In the example above, the sample density varies by factors of two between layers of the pyramid. As the values of $s_D$ (x, y; x', y') are traversed, the pyramid's structure forces adjustment of sample density by a minimum factor of two. In consideration of the error contribution, the least advantageous samples can have an area-based density as much as two times greater or less than that which is ideal. This observation encourages examination of smaller sample-ratio increments. A pyramid of images having very small increments would contain a great many layers and occupy much storage memory, so this option might be dismissed as impractical, especially in the light of the more attractive alternative described in the following.

If a sampling pattern is computed in which density varies locally in a smooth manner, such that it adapts to a uniform error-contribution requirement, the disadvantages of the pyramid method can be overcome. More significantly, in such a sampling pattern the sample density itself can be used to encode the weighting required by $s_D$ (x, y; x', y'). Thus, explicit multiplication may be completely eliminated in computing the integral or matrix product.

Selected Ordinate Concept Consider the accuracy and precision requirements of computing an arbitrary one-dimensional weighted integral $$g = \int w(x) f(x) dx, \quad (10)$$

where f(x) is a function to be integrated, w(x) supplies the required weighting, and x is the independent variable of integration. The value of a two-dimensional integral product such as the one in Equation (2) may be obtained for any corresponding value of its argument by computing just such an integral, and the discrete product required for stray-light correction by Equation (9) offers a similar case. Equation (10) may be approximated by the discrete sum so that $$g \approx (1/N) \sum_i w_i f_i \Delta x_i, \quad (11)$$

where $\Delta x_1 = \Delta_2 = \ldots = \Delta x_N$ is the uniform spacing between N samples. In order to minimize the labor of computing this approximation, it is desirable to distribute the burden of precision equally amongst the terms summed, and equally to each multiply-and-add pair of operations, i.e., each term should contribute equally to the resulting error. If the variances of terms $w_i f_i$ are equal, a simple sum will suffice to this end. However, this would be an unusual case, to say the very least.

In a practical case, there might be no prior knowledge of f(x). Considering the precision of g in complete absence of such knowledge, a reasonable choice is that the fi are equal. Under these circumstances terms $w_i f_i$ do not contribute equally to the sum, so each multiply-and-add pair of operations contributes unequally to the precision of the result. Being confined to a set of evenly spaced samples $f_i$, there is no means to achieve the goal of error contributions that are uniform over a desired domain. An alternate weighting of the terms would produce a result that is not consistent with the definition of g. The clue to improving precision and computational efficiency is found by examining the assumption of equal sample spacing.

In accordance with the foregoing, if the sample spacing $\Delta x_i$ is adjusted so that each term contributes equally to the error, optimal use is made of the labor expended not only in sampling, but in computation as well. Specifically, let the local sample spacings now vary inversely with weights $w_i$ such that spacing $\Delta x_i = 1/w_i$ incorporates the effect of the weight. Here $1/w_i$ may be taken as the spacing between the $(i-1)^{th}$ and the $i^{th}$ samples, the $i^{th}$ and $(i+1)^{th}$ samples, or the spacing may be divided in some other manner in proximity of the sample. For example, the spacing between the $i^{th}$ and $(i+1)^{th}$ samples may be taken as $0.5 ((1/w_i)+(1/w_{i+1}))$. By any of these methods the weights no longer appear explicitly in the sum. Because computation of the integral no longer involves even a single multiplication, the number of arithmetic computations is immediately halved. Moreover, because the samples are placed only where they are the most needed, i.e., where the $w_i$ has its largest values, fewer samples are required for a result having a given precision. In particular, in the case of photon-counts or Poisson detection noise, assumed uniform f(x), and a collection of all counts over the specified interval, each term on average contains the same number of counts, has the same variance, and thus contributes equally to the precision of g, which is the goal.

Consider also the case in which f(x) is affected by additive noise. Here f(x) may be finely sampled with even sample spacing. The uneven spacings $\Delta x_i$ described in the foregoing may then be used to establish which of the fine samples are to be included in the sum, the other samples being ignored. In this case, as before, all the samples included in the sum have equal variance, though the information from the fine samples between those selected does not contribute to improving the precision of the sum.

Before the advent of digital computers, spectroscopic colorimetry employed a technique of adjusting sample spacing inversely with the desired weighting to achieve efficient computation of the weighted integrals. No multiplications are necessary with this selected-ordinate method. See D. B. Judd and G. Wyszecki, Color in Business, Science, and Industry, 3rd ed. J. Wiley and Sons, New York, 1975, p. 149. An operator records a spectral-reflectance curve on chart paper pre-printed with vertical lines, or ordinates, selected according to the weighting required by the standard-observer functions. The operator then merely reads the ordinate values at the selected locations and adds them to compute the required weighted integral. Though a primary motivation is to eliminate multiplication, far fewer samples are found to be necessary for accurate color determination.

SUMMARY OF THE PRESENT INVENTION

The present invention is directed to a method, program and apparatus of correcting an image of an object, wherein the image comprises one or more dimensions and has a plurality of image elements and the image, or the data used to create the image, is corrupted by smearing or misdirected flux. The present invention removes the effect of the corruption on the image, the method comprising the steps of:

a) sampling portions of the image of the object at unequal intervals, the intervals being selected to effect an implicit weighting of the samples corresponding to a predetermined weighting function;

b) summing the implicitly weighted samples to create an approximation to a weighted integral;

c) repeating steps a)–b) to compute weighted integrals associated with each of the plurality of image elements thereby to obtain a correction to the image.

The present method further comprises the step of determining a weighting function that characterizes the corruption before performing step a). After obtaining the correction to the image the correction is applied to the image to remove the corruption and to create a corrected image.

The method may be applied in an iterative manner and may further comprise the steps of: applying an additional correction term containing a sum of implicitly weighted samples to each element of the corrected image to update the corrected image and then repeating this step until a predetermined stopping criteria has been satisfied.

The method of the present invention may also be applied to situations where the number of dimensions of the image differs from the number of dimensions of the object.

In a preferred embodiment, the method of the present invention uses sampling patterns in two dimensions analogous to the one-dimensional, hand performed, spectroscopic sampling to compute the weighted integrals necessary to apply methods such as those expressed by Equation (4) and Equation (9).

BRIEF DESCRIPTION OF THE FIGURES

The invention will be more fully understood from the following detailed description, taken in connection with the accompanying drawings, in which.

DETAILED DESCRIPTION OF THE INVENTION

Throughout the following description, similar reference characters refer to similar elements in all Figures of the drawings.

Generating the Predetermined Weighting Function Before the selected ordinate image sampling of the present invention is performed, a step of determining a weighting function that characterizes the corruption to the image is performed. For applications to objects and images having two-dimensions, the weighting function may be generated by any of the methods outlined in U.S. Pat. No. 5,153,926 for producing the response coefficients required therein, or by any other method suited to this task. In U.S. Pat. No. 5,153,926, the imaging apparatus is calibrated using a test object having known properties. This test object may be the preferred object comprising a plurality of flux sources, singly excited in some predetermined order, or another known test object, such as a high-contrast edge. In a publication authored by Berge Tatian "Method for Obtaining the Transfer Function from the Edge Response Function," Journal of the Optical Society of America, Volume 35, Number 8, August 1965, the use of a high-contrast edge test object is described. It should be appreciated that the transfer function may be identified with the Fourier transform of the desired weighting function. Also, it should be appreciated that other forms of test object may be found useful, or the response coefficients may be calculated based upon the design of the imaging apparatus, or the weighting function may be selected arbitrarily.

By analogy to the two-dimensional imaging case, weighting functions required by imaging systems having other dimensionality, or by imaging systems in which object and image have differing dimensionality, may be determined by use of a suitable known test object.

Generating the Selected-Ordinate Pattern In accordance with the present invention, to sample an image according to a specified weighting function using selected ordinates, first sample locations are generated such that the local sample density varies in accordance with the weighting function. The resulting sample pattern depends on how the "local sample density" is determined. In a first "local sample density" method, the average distance from a given weight location to the P closest neighboring samples is computed. The square of this distance then becomes a measure of the area covered by the samples. It is recognized that geometric distribution of the P samples influences the precise area covered, but for practical purposes this effect may be ignored. A first alternative "local sample density" method may explicitly build the precise area into the density estimate. For example, the number of samples within a specific geometrically defined neighborhood may be counted. In a second alternative method the sample contributions to the density estimate could be weighted according their relative position within the neighborhood, thereby giving the neighborhood "fuzzy" boundaries.

To apply the method of sample-pattern generation, the local sample density, according to whatever definition is used, at each pixel is compared to the weight desired for that pixel. If the density is smaller than that specified by the weight, or a fixed predetermined fraction of that weight, a sample is assigned to that pixel location. In practice, it has been found useful to assign the first sample at the location of the weighting function peak, and to iterate (cycle) through all of the image coordinates several times. During the first cycle, an attempt is made to satisfy only a small fraction of the targeted weighting. Subsequent iterations (cycles) satisfy larger and larger fractions until the last pass, at which time the full weight sample densities are obtained. The result is a full complement of the sample locations needed to achieve the desired weighting. The sample-coordinate selecting process is illustrated by the pseudo-code listing of a program for implementing the method of the present invention shown in FIG. 2.

In order to balance the requirements of computational load against sampling accuracy, the total number of samples may be constrained. Also, the result of implementing a computation, such as that of Equation (11), might yield a value that is scaled smaller or larger than the desired value, yet otherwise exhibits the features that are desired with respect to weighting. In this circumstance, the results of all the pixel computations for a single isoplanatic patch may each be multiplied by a single constant scale factor, determined for that patch, thereby accommodating scaling imposed by a number-of-samples constraint, sample sparsity, and other phenomena that affect scaling.

In some circumstances it may be desirable to use two or more sets of samples, adding their contributions with different scale factor weightings.

The approach of adaptively varying the interval between image sample coordinates in the present context bears a certain appearance of similarity to methods used to place half-tone dots for printing images. In the present case, it is desired to minimize the error in the image by optimal choice of sample coordinates. In the half-tone dot case it is desired to maximize the acceptability of appearance of a displayed image by optimal choice of the half-tone dot coordinates. In the present case of selecting image sample coordinates, the ideal function is related to the point spread function s. In the half-tone dot case the ideal function is the image to be displayed and the dot coordinates are not used to sample another function, as in the present case. For a discussion of half-toning, see D. L. Lau and G. R. Arce, Modern Digital Halftoning, Marcel Dekker, New York, 2001.

Isoplanatic Patches If the form of the point-spread function is such that the convolution of Equation (2) is an adequate approximation to the more general form of integral product of Equation (1) over a limited region of an image, such a region is called an "isoplanatic patch". In this case a single set of weights may be employed over the patch by adding x and y offsets to the selected ordinate sample locations as they are used to sample the image.

The general point-spread-function kernel may be re-formulated as a new function containing a set of x and y difference coordinates by defining $$s_g(x-x', x'; y-y', y')=s(x, y'; x', y'). \qquad (12)$$

An isoplanatic patch may then be defined as one over which $s_g(x-x', x'; y-y', y')$ varies slowly with x' and y' even though it may vary rapidly in the difference coordinates x-x' and y-y'. Within that patch we then can have $$s_b(x-x', y-y')=s_g(x-x', x_0; y-y', y_0), \qquad (13)$$

where $x_0$ and $y_0$ may, for example, be patch center coordinates. Each patch has, of course, a different $s_b$.

Accuracy of the Selected Ordinate Estimate In order to roughly assess the number of samples required to correct an image for stray-light contamination, consider an image in which each pixel is contaminated with "salt-and-pepper" bimodally distributed noise ranging over 5% of full scale, i.e., from $-I_0/40$ to $+I_0/40$. Specifically, the image pixels are all affected by error contributions having values of either $-I_0/40$ or $+I_0/40$. These contributions affect each and every image pixel, and are present in equal number for each type of contribution, the type of contribution affecting a given pixel being randomly chosen. The variance of this noise is given by $I_0^2/1600$. If a normal distribution of the noise error is assumed, the variance of the of L-sample mean is given by $I_0^2/1600L$. Employing 64 samples to estimate the stray-light contribution at each pixel implies that the estimate will have standard deviation $(I_0^2/102400)^{1/2} \approx 0.0031\, I_0$. If it is anticipated that stray-light contaminates each pixel at a level of at least several percent, the image would seem to be adequately sampled via the selected ordinate method to provide an effective estimate of stray-light content and therefore should afford substantial improvement.

It should be noted that no computational method of correcting for stray-light contamination based on the image data alone can accurately correct for contamination by sources of flux falling outside the bounds of the image. This is caused by a lack of data required to determine the degree of that "out of bounds" contamination. Such "out of bounds" contamination may be estimated from data within the image. This estimate may be used to approximately correct for such "out of bounds" contamination. Lenses may be designed with features that minimize, but do not totally eliminate, image contamination by stray light from such sources.

Computational Advantage of Selected Ordinate Method Assume that it has been found sufficient to sample the image at L selected ordinates in order to achieve a selected-ordinate-based estimate having the desired statistical precision at each image pixel. Because only addition operations (no multiplications) are needed, approximately $LN^2$ operations will suffice to process the entire image regardless of the number of isoplanatic patches. Combining this result with the expression on Line (9A) above, it may be determined that the selected-ordinate method runs faster than the Fourier method by a factor of $$(10 \log_2 N+6)N^2/M^2L. \qquad (14)$$

To see whether improvement is significant in a practical case, consider typical values for the variables in this expression. Consider a four megapixel image, having dimensions 2048×2048, broken into 64 isoplanatic patches, each patch having dimensions 256×256. Previously it was found that 64 selected-ordinate samples were sufficient for stray-light correction to within 0.31% in a representative case. Substituting the values N=2048, M=256, and L=64 into the expression in Equation (14) gives a 116-fold improvement over an FFT-based method—over two orders of magnitude reduction in computation time.

Pyramidal Selected-ordinate Sampling Selected-ordinate sampling might be expected to work especially well for images containing distributions of flux that vary slowly with coordinate and distributions over a small dynamic range. However, images containing point sources, for example, would be problematic because a given sampled pixel might poorly represent its neighbors. For these cases, the pyramid concept comes to the rescue. Where the density is low, the sample can be chosen from a high level in the pyramid, where each value already represents an average of neighboring values. Conversely, where the sample density is high, a lower level would be chosen.

Figure 3:
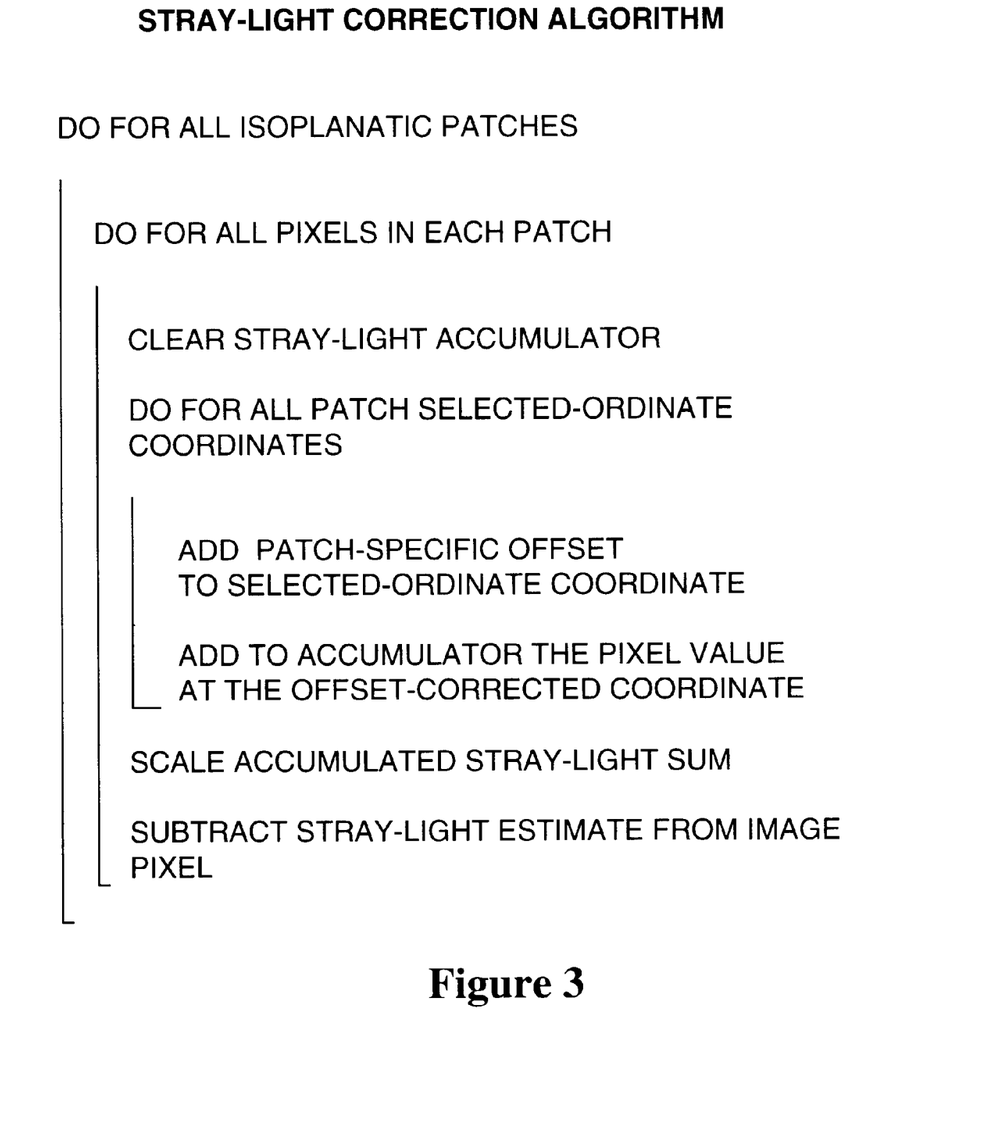
FIG. 3 presents pseudo code showing the process of computing a weighted integral using the selected ordinate selected coordinates.

Efficient Computation and Hardware Once a sampling pattern has been established, the locations of the samples for a given isoplanatic patch can easily be stored in a lookup table. Stepping through the lookup table generates the coordinate locations in sequence. Pixel values stored at those locations are merely summed to produce a weighted sample of the image that requires at most only a single multiplication for scaling purposes. When applied to a convolution product over a particular isoplanatic patch, the coordinate pair of values from the lookup tables is a pair of offsets to be summed with the coordinates that locate that particular patch. The result of this pair of sums gives the sample location relative to the full image. A psuedo-code listing that applies the selected ordinate samples to calculate a convolution product over a particular isoplanatic patch in accordance with the present invention is shown in FIG. 3.

Implementing a convolution over a finite spatial domain involves consideration of the special treatment kernel samples must be given as they shift beyond the bounds of that domain. The effect is particularly pronounced when the kernel is broad. In the case of stray-light, this kernel, $s_D$, extends over the entire domain. Because the image is to be divided into patches, however, special processing is required only in the so-called "border region" of the image. The breadth of the border region is nominally half the patch breadth, assuming the patch's $(x_0, y_0)$ pixel is centered in the patch. Minimizing this border's breadth is another good motivation to divide the image into such patches. A preferred special treatment is the substitution of the closest in-bounds pixels for samples specified beyond the bounds. Of course another suitable approximation could be used.

Note that throughout the present method, no Fourier transforms are required, and no multiplications are needed in the inner computational loops. Simple integer arithmetic sums are sufficient. The computation is sufficiently simple that design of special-purpose processor hardware specialized to this task is straightforward. The principal features of such a processor are outlined by the block diagram FIG. 4.

Figure 4:
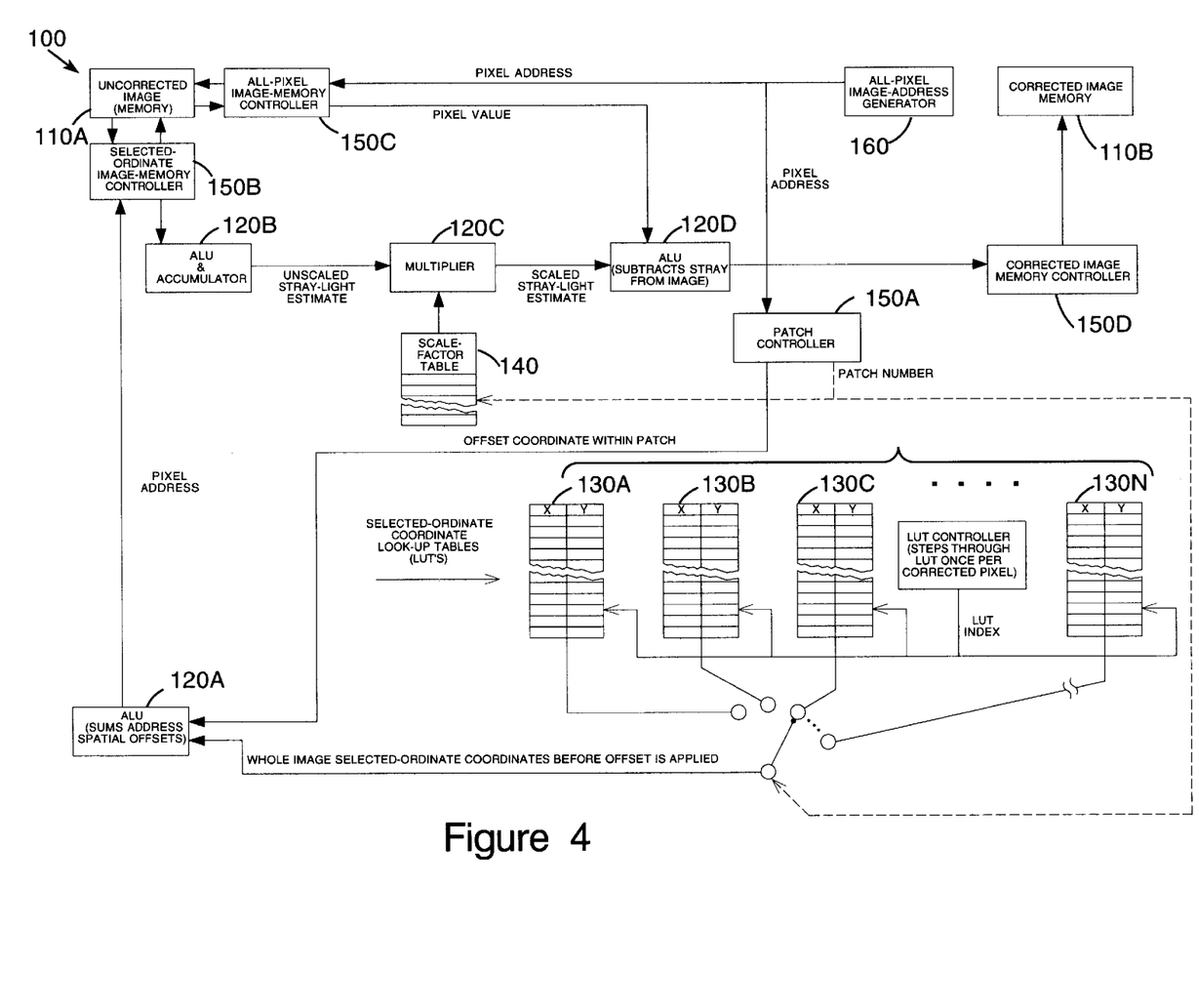
FIG. 4 shows an apparatus which may be used to implement the present method.

FIG. 4 shows an apparatus generally indicated by the reference character 100 for correcting an image of an object in accordance with the method of the present invention. The apparatus 100 comprises an image memory 110 having one or more partitions 110A, 110B for storing an input image and a corrected image; an arithmetic logic unit 120, comprising sub-units 120A, 120B, 120C, 120D, for performing arithmetic computations; a plurality of look up tables 130A, 130B, 130C, . . . 130N for storing selected-ordinate image coordinate values; a scale factor look up table 140, a controller 150, comprised of sub-units 150A, 150B, 150C, 150D, and an image address generator 160. The functional elements 110, 120, 130, 140, 150, 160 may operate under a program in accordance with the present invention for addressing the image memory 110 and selecting lookup tables 130. The program may be stored on any suitable computer readable medium. Alternately a full hardware implementation of the functional elements may be employed.

In operation, first an image of the object is stored in the image memory 110A. The controller 150C, under the control of the program, selects a first element of the image; the controller 150A selects a lookup table 130 appropriate to that image element. It is assumed that the imaging system has already been characterized as previously described. Thus each lookup table 130 already contains coordinates of locations at which the image is to be sampled before the offsets required by convolution are applied. The samples are taken at unequal intervals, the intervals being selected to effect an implicit weighting of the samples corresponding to a predetermined weighting function. In practice the lookup tables 130 are typically implemented as read-only memories (ROMs). The controller 150A then steps through the selected lookup table 130. The arithmetic logic unit 120A sums the coordinates from the lookup table with the spatial offsets to generate a pixel coordinate. The pixel coordinate is used to retrieve a pixel value. Pixel values are accumulated by 120B. The accumulated result is passed to 120C which multiplies the value by a scale factor from 140, selected to correspond to the selected lookup table 130. The output of 120C is thus an approximation to a weighted integral for that image element which comprises a correction for that pixel. The weighted integral is subtracted from the pixel and the result is stored in the image memory 110B. The controller 150C selects a next image element and the above steps are repeated to compute weighted integrals associated with each of the plurality of image elements. As described above, each element of the corrected image may be computed as soon as the weighted integral for that image element has been found or the entire corrected image may be computed after all weighted integrals for all the image elements have been found.

The apparatus 100 may be implemented as a so-called application specific integrated circuit (ASIC) using any commercially available "ASIC toolbox" or digital signal processor (DSP). The integrated circuit implementation is preferred because permits the apparatus 100 to be physically housed within a digital camera.

Corrected pixels may be stored in a separate partition of the memory 110 as shown in FIG. 4, or corrected pixels may be returned to the input (i.e., uncorrected) image memory location, thereby doing the correction "in place." This savings in image memory obtains because each pixel is corrected by only a fraction of its full-scale dynamic range. Thus, corrected and uncorrected images are approximately the same for the purpose of computing the correction. The two-memory and one-memory techniques are well known as point-simultaneous and point-successive iterative methods, respectively, to those who solve dominant-diagonal sets of simultaneous linear equations. See Jansson, previously cited, pp. 85–89. Besides saving memory, the modified method converges faster when iterations are required. Faster convergence results in less error, even when only one iteration is employed, as in Equation (9). However, point-successive methods are known to introduce solution assymetry when only partially converged because processing is sequential. In the present application this assymetry is readily mitigated by processing pixels in the order given by address-bit reversal. See Jansson, previously cited, pp. 85–89.

EXAMPLE 1

In order to correct the image for stray-light contamination, it is necessary to compute an object estimate according to Equation(9). This equation contains the matrix product $s_Di$, which, according to the foregoing, may also be expressed with matrix elements proportional to the weighted sum of image pixels $i(x', y')$, $$\sum_{x'}\sum_{y'} s_b(x - x', y - y')i(x', y'), \quad (15)$$

where the sum is taken over all the image coordinate values $x'$ and $y'$ for each image pixel to be corrected.

According to the method of the present invention, for each such pixel, this sum may be replaced by the unweighted sum $$\sum_{\substack{selected\ set \\ of\ (x',y') \\ coordinates}} i(x', y'). \quad (16)$$

Figure 2:
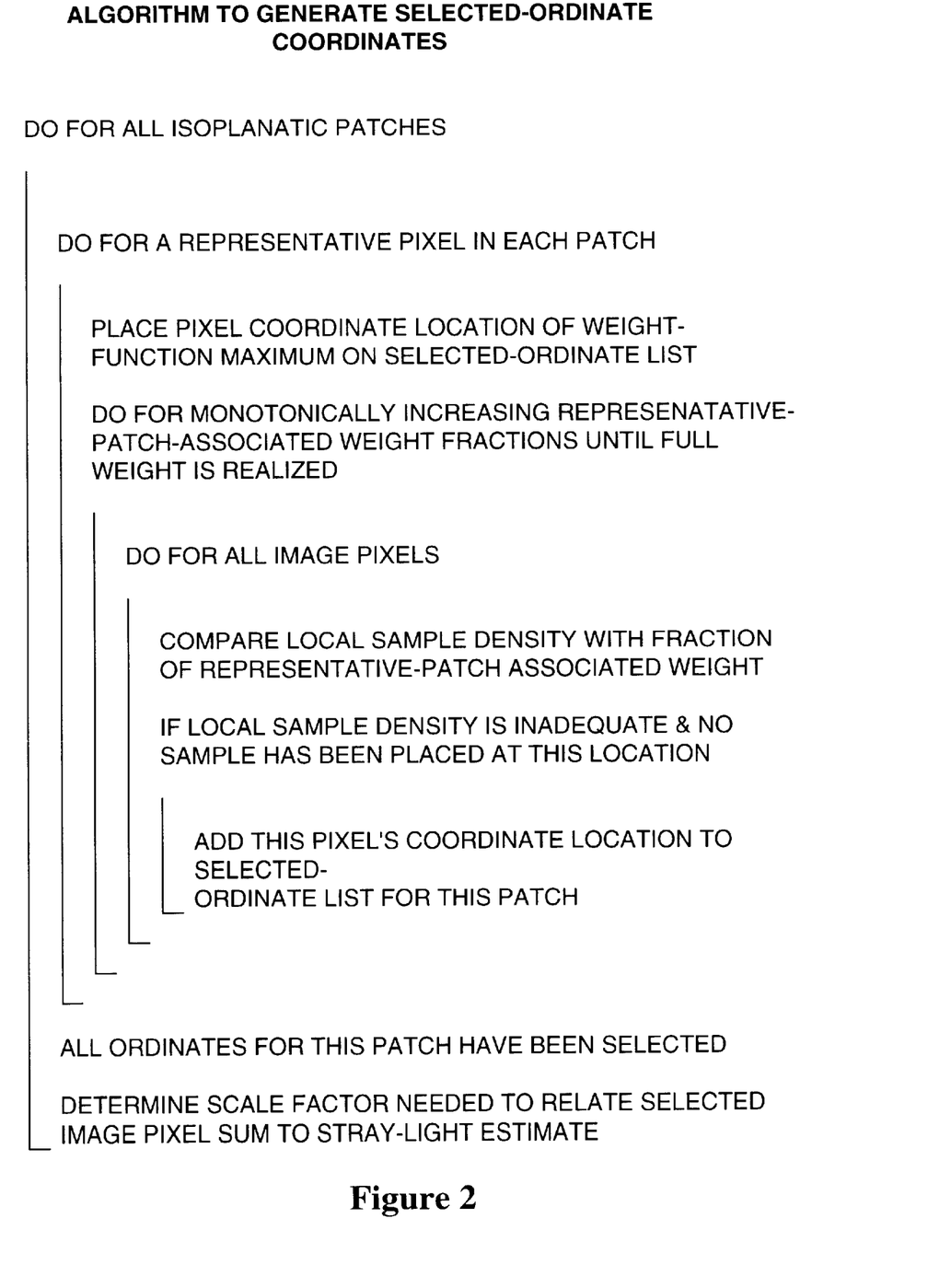
FIG. 2 presents pseudo code showing the sample-coordinate selecting process.

This sum is not taken over all the image coordinate values, but rather merely over a certain set of image pixel coordinates chosen according to the algorithm shown in FIG. 2, or by some other appropriate means satisfying the requirements of implicit weighting as previously described. In keeping with the coordinate requirements for a discrete convolution, each pixel to be corrected will require different x and y offsets between the coordinates of $i(x, y)$ and the sampling pattern corresponding to $s_b(x, y)$. This may be clarified by reference to the example illustrated in FIG. 1A.

Figure 5:
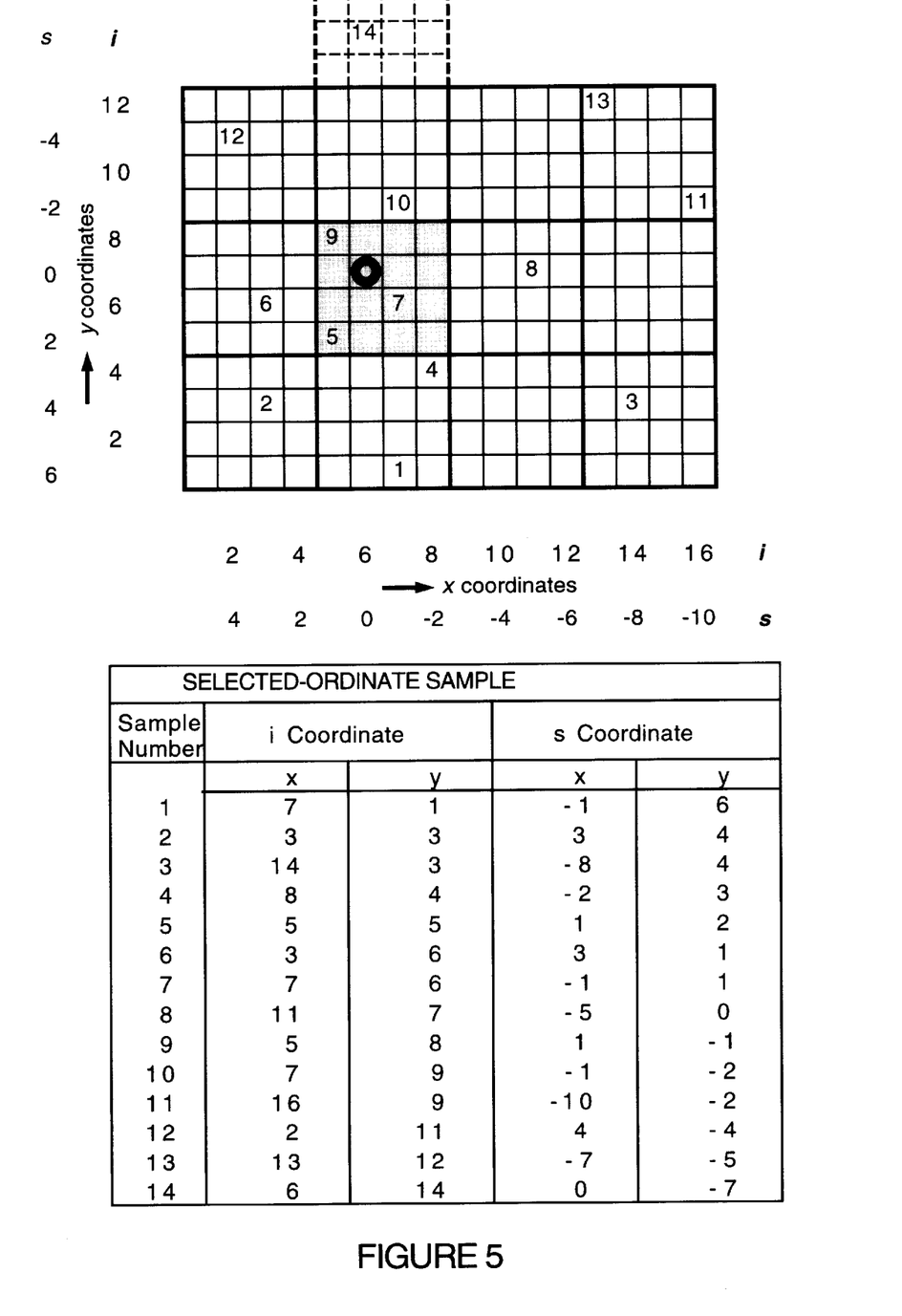
FIG. 5 depicts a highly simplified case of selected ordinate sampling of the image within an image.
Figure 6:
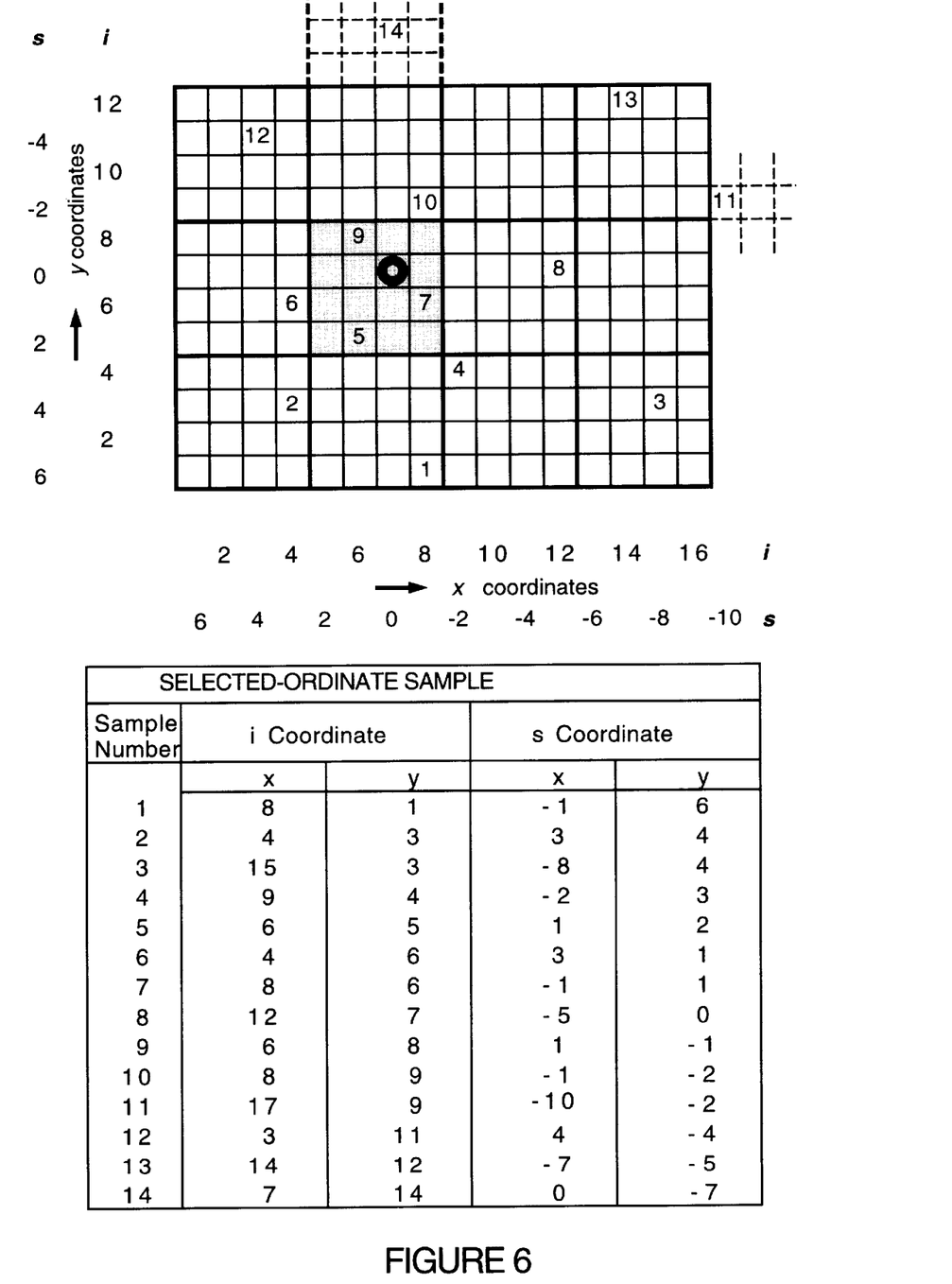
FIG. 6 shows the image samples selected to correct an adjacent pixel in the same isoplanatic patch of the image of FIG. 5.

FIG. 5 depicts a highly simplified case of selected ordinate sampling of the image. A 12-pixel-high by 16-pixel-wide image is shown as a checkerboard-like array of pixel squares. A hypothetical sample set of selected-ordinate coordinates are plotted by sample number (1 through 14) in the pixels selected to effect the desired implicit weighting. Note that sample number 14 actually lies outside the 12 by 16 image. The sample-set coordinates are listed in the table to the right. For purposes of this example, it is assumed that the sampling pattern to effect this weighting could have been chosen by means of the algorithm of FIG. 2 or by any other appropriate means. Plot coordinates are given relative to both pixel coordinates of the image i, and to the coordinates of the spread function $s_b$. Image values at the selected locations are then summed to effect a correction to the pixel identified by the circle, which corresponds to $s_b(0,0)$. The image depicted in FIGS. 5 and 6 is to be understood as comprising 12 isoplanatic 4-pixel by 4-pixel patches identified in FIGS. 5 and 6 by the heavier outlines. All pixels within the 4×4 square containing the circle will be corrected by employing a sum of samples selected by using the same pattern. That is, the pixels selected will bear the same spatial relationship to each other and to the pixel to be corrected, for each of the image pixels to be thus corrected within the shaded isoplanatic patch.

To further clarify the sample shifting necessary in order to compute the convolution, FIG. 6 shows the image samples selected to correct an adjacent pixel in the same isoplanatic patch. It is noteworthy that this shift has moved sample 11 outside the bounds of the available image information, as is sample 14 both in the present and previous cases. A question thus arises as to the value assigned to the missing pixels. As has been explained in a previous section, one expedient is to employ the value of the closest available pixel, thereby implicitly assuming that the image would be slowly varying across its boundary had the missing pixels also been available.

It should be noted that an identical procedure is followed for all image pixels, even those outside the shaded isoplanatic patch. In the more general case of a shift-variant spread function, however, twelve different sample patterns would be required, a different sample pattern to be used for each isoplanatic patch. In the general case of the example illustrated, the pattern shown in FIGS. 5 and 6 would only be useful for the shaded patch.

Applications to Volume Reconstruction As previously stated, the present method may be applied to three-dimensional situations. One or more image target volume element values of a volume reconstruction may contain unwanted contributions, such as might occur as a result of scattering phenomena. Examples of methods that yield such reconstructions include x-ray computed tomography (CT), magnetic-resonance imaging (MRI), and positron emission tomography (PET). In these reconstructions, target volume element values might represent x-ray absorbance, x-ray density, absorption coefficient or other physical property, or the values might represent flux emitted from object volume portions corresponding to the image target volume elements. In these cases the target volume data may be processed by three-dimensional selected-ordinate convolution in a manner fully analogous to the two-dimensional selected-ordinate convolution in order to remove the unwanted contributions (e.g., stray or misdirected flux), or to effect enhancement of some image-volume property such as resolution.

Under these circumstances, it should be appreciated that the two dimensional selected-ordinate method of computing a discrete convolution, and its extension to the shift-variant case via convolution within isoplanatic patches, may be readily extended to an arbitrary integral number of dimensions merely by changing the dimensionality of the associated integrals and sums in a straightforward way. In a three-dimensional case of tomography, all the volume elements, or voxels, of the object have potential to contribute to each single target voxel of an image target volume via weighted sums. An approximation to each voxel of the target image volume may be obtained by extending the selected-ordinate method to three dimensions. Thus, the selected-ordinate samples in this three-dimensional application are a specific set of object voxel values. The sum of these samples implicitly contains the weighting function required to compute a single target voxel value by virtue of the volume density of those selected-ordinate samples, in a manner fully analogous to the two-dimensional case. In accordance with this concept, selected-ordinate convolution may be applied to the image target volume to remove unwanted contributions from each of its voxel values.

Besides the removal of unwanted contributions such as stray flux, the present method of selected-ordinate convolution may be employed to filter volume data, such as those data resulting from computed tomography or some other volume reconstruction method. Such filtering may enhance sharpness, resolution, or for reveal some other desired property of an object. In these filtering applications, sampling patterns corresponding to convolution weightings appropriate to the task are employed.

Analogous to the two-dimensional case, the form or magnitude of the weighting function used for three dimensions may vary slowly over the image volume such that a condition of three-dimensional shift variance applies. A uniform region, in this case a uniform volume, may be defined that is analogous to the two-dimensional isoplanatic patch. In such a uniform volume the form or magnitude of the weighting function varies less than some predetermined amount. Within that uniform region, selected-ordinate convolution is deemed an adequate approximation to shift-variant processing. In order to process the entire image volume, the region (in this case, the volume) is subdivided into a plurality of such uniform regions. Each uniform region will have an associated set of weights and a corresponding sampling pattern. Again, the processing is analogous to that employed in a two-dimensional situation, so that selected-ordinate convolution may be carried out for each uniform region or volume by using a sample pattern identified with that volume, thereby to carry out a shift-variant processing over the entire image volume.

EXAMPLE 2

Higher Dimensions: An Example from Four Dimensions Applications in four and higher dimensions are also practical. It is anticipated that the processing advantage (i.e., reduced computational requirement) of the selected-ordinate method over conventional methods would increase with increasing dimensionality. To cite an example of a four-dimensional case, consider the time variation of a series of 3-D tomographic reconstructions. In this example, time comprises the fourth dimension. Each successive reconstruction in the series could contain contributions from the previous reconstructions. Thus, four-dimensional filtering by the selected-ordinate method would be required to process the four-dimensional data to remove unwanted contributions originating from various locations, both spatial and temporal. In analogy to the two- and three-dimensional cases, shift-variant processing may be accomplished by dividing the image into uniform regions having smaller dimensions, but the same dimensionality as the image.

In the context of image correction, the term "stray flux" or "smearing" is used to describe corruption effects upon an image. It is to be understood that the term "smearing" includes effects described by the term "stray flux" and also includes "temporal smearing".

In the context of image formation, the term "misdirected" is used to describe flux that is analogous to the "stray flux" or "smearing". The term "misdirected" also includes "temporally misdirected".

EXAMPLE 3

Application to Finite Impulse Response Filtering (FIR) in One Dimension It should also be appreciated that a one-dimensional selected-ordinate filtering method is also useful. The previously discussed spectrometry determination of single, separate calorimetric X, Y, and Z values employed selected-ordinate sampling but not the selected-ordinate convolution of the present method. Application of discrete convolution, and its analog, by selected-ordinate convolution in one dimension finds specific application in circuits to carry out finite-impulse-response filtering of electronic signals. Such filtering could include cases where the filter transfer function varies with time: a shift variant case. High-speed tapped analog delay line finite-impulse-response filters may be designed in accordance with the selected-ordinate method. By reducing the number of samples and eliminating multiplication operations, cost and complexity are reduced while speed of filter response is increased.

EXAMPLE 4

Mixed Dimensions Selected-ordinate convolution also has practical application to image formation, image filtering and image correction in cases where the object and image differ in their dimensionality. Suppose, for example, a two-dimensional target plane receives contributions from a number of volume element portions of an object volume. Telecentric microscopy of a volume of fluorescing light sources is such an example. Each image target element receives flux primarily from emitters along a line parallel to the optical axis. It also receives flux from adjacent lines owing to light scattering in the object, to finite depth of focus, to optical diffraction, and other phenomena characterized by a volume point-spread function. Also, some of the flux may be absorbed in the object. Thus the flux arriving at a given image-plane target element is affected by a plurality of object volume portions. To an approximation, the equation that describes this situation is $$i(x, y) = \iint_{\substack{object \\ volume}} s(x, y, x', y', z') o(x', y', z') dx' dy' dz'. \quad (17)$$

In this equation, $o(x', y', z')$ is the flux emitted by the object volume, $i(x, y)$ is the projected image, and $s(x, y; x', y', z'$ is the projection operator that describes the physics of this scenario. The quantities x and y are spatial Cartesian coordinates of the image, and x', y', and z' are volume coordinates within the target volume. As before, if the function $s(x, y; x', y', z')$ cannot be reformulated as a convolution over the entire object, it may be possible to do so over a smaller uniform volume. When this situation applies, as should almost always be the case, selected-ordinate convolution can be used to compute $i(x, y)$ values from $o(x', y', z')$ values by applying Equation (17) above. Accordingly samples of $o(x', y', z')$ are chosen according to the selected-ordinate method. Accordingly, the $i(x, y)$ values may be processed via selected ordinates to remove unwanted contributions from undesired portions of $o(x', y', z')$. Also, image $i(x,y)$ may be filtered via a selected-ordinate convolution to enhance resolution or otherwise improve or alter its properties in a desired fashion. In some cases, it will be desired to selectively sample computed or assumed values for the object elements in accordance with the selected-ordinate method in order to effect the correction.

Analogously, selected-ordinate convolution may be applied to objects and corresponding images having different dimensionalities.

Applications include obtaining images from objects, filtering, correcting, and otherwise processing images having arbitrary dimensionality.

It is to be understood that in when applying the selected-ordinate method in the case of mixed dimensionality, discrete summations take the place of the integral of Equation (17) in the foregoing, and that the role of the weighting described by $s(x,y; x',y',z')$ is assumed by the spacing of the volume element samples. As in the two-dimensional case, the weighting is implicit in the sample spacing. It is to be anticipated that special purpose processors, similar to those employed in the two-dimensional case can also be applied to effect selected-ordinate convolution for applications having arbitrary and mixed dimensionalities.

Iteration It should be appreciated that whereas the preferred mode of image correction by selected-ordinate processing employs only one cycle of an otherwise iterative computation exemplified by Equation (9), iteration may yield a more highly corrected image. Accordingly, an iterative method, as described by Equation (4), may be applied to images having any dimensionality. In such applications, it may also be desired to alter the normalized value of s during some of or all of the cycles of iteration such that $s_P$ does not equal I (the identity matrix) for those iterations. As is typical for iterative methods, cycles of iteration may proceed until a fixed amount of time has elapsed, a fixed number of cycles have been executed, or the correction-term magnitude becomes smaller than some predetermined stopping value. Other criteria may also be used, either alone or in combination with one or more of the aforesaid criteria.

What is claimed is:

1. A method of correcting an image of an object, the image comprising one or more dimensions and having a plurality of image elements and the image being corrupted by smearing, to remove the effect of the smearing on the image, the method comprising the steps of:
    a) sampling portions of the image of the object at unequal intervals, the intervals being selected to effect an implicit weighting of the samples corresponding to a predetermined weighting function;
    b) summing the implicitly weighted samples to create an approximation to a weighted integral;
    c) repeating steps a)–b) to compute weighted integrals associated with each of the plurality of image elements thereby to obtain a correction to the image.

2. The method of claim 1 further comprising, before step a), the step of determining a weighting function that characterizes the smearing.

3. The method of claim 1 further comprising:
    d) applying the correction to the image to remove therefrom the smearing corruption to create a corrected image.

4. The method of claim 3 further comprising the steps of:
    e) applying an additional correction term containing a sum of implicitly weighted samples to each element of the corrected image to update the corrected image;
    f) repeating step e) until a predetermined stopping criterion has been satisfied.

5. The method of claim 4, where the image is used as a first approximation to the corrected image.

6. The method of claim 4, wherein the number of dimensions of the image differs from the number of dimensions of the object.

7. A method of obtaining values of image elements, the image having a plurality of dimensions, in an flux imaging system characterized by a portion of the image flux being misdirected, the method comprising the steps of:
    a) sampling portions of an object at unequal intervals, the intervals being selected to effect an implicit weighting of the samples corresponding to a predetermined weighting function;
    b) summing the implicitly weighted samples to create an approximation to a weighted integral;
    c) repeating steps a)–b) to compute weighted integrals associated with a plurality of image elements thereby to obtain the values of the image elements.

8. The method of claim 7 further comprising, before step a), determining a weighting function that characterizes the misdirection.

9. The method of claim 7, wherein the number of dimensions of the image differs from the number of dimensions of the object.

10. A method of correcting an image of an object, the image having a plurality of image elements and the image being corrupted by stray flux, to remove the effect of stray flux on the image, the method comprising the steps of:
   a) sampling portions of the image of the object at unequal intervals, the intervals being selected to effect an implicit weighting of the samples corresponding to a predetermined weighting function;
   b) summing the implicitly weighted samples to create an approximation to a weighted integral;
   c) repeating steps a)–b) to compute weighted integrals associated with each of the plurality of image elements thereby to obtain a correction to the image.

11. The method of claim 10 wherein the image comprises a plurality of uniform regions, wherein the weighting function within a uniform region does not vary by more than a predetermined amount.

12. The method of claim 11 wherein each uniform region of the object or its corresponding image is associated with a different sampling pattern.

13. The method of claim 10 further comprising:
   d) applying the correction to the image to remove therefrom the stray-flux corruption.

14. A method of filtering an image, the method comprising the steps of:
   a) sampling portions of the image at unequal intervals, the intervals being selected to effect an implicit weighting of the samples corresponding to a predetermined weighting function;
   b) summing the implicitly weighted samples to create an approximation to a weighted integral;
   c) repeating steps a)–b) to compute weighted integrals associated with a plurality of image elements thereby to compute a filtered image.

15. The method of claim 14 wherein the image comprises a plurality of uniform regions, wherein the weighting function within a uniform region does not vary by more than a predetermined amount.

16. The method of claim 15 wherein each uniform region of the object or its corresponding image is associated with a different sampling pattern.

17. A method of obtaining values of image elements, the method comprising the steps of:
   a) sampling portions of an object at unequal intervals, the intervals being selected to effect an implicit weighting of the samples corresponding to a predetermined weighting function;
   b) summing the implicitly weighted samples to create an approximation to a weighted integral;
   c) repeating steps a)–b) to compute weighted integrals associated with a plurality of image elements thereby to obtain the values of the image elements.

18. The method of claim 17, wherein the number of dimensions of the image differs from the number of dimensions of the object.

19. The method of claim 17 wherein the image comprises a plurality of uniform regions, wherein the weighting function within a uniform region does not vary by more than a predetermined amount.

20. The method of claim 19 wherein each uniform region of the object or its corresponding image is associated with a different sampling pattern.

21. A method for imaging an object having a predetermined number of discrete portions thereon, the object having flux emanating therefrom, by generating a signal representative of the total incident flux on each area element of a target plane, each area element corresponding to a portion of the object, the signal being representative of the sum of flux emanating from the corresponding portion of the object plus flux scattered from scattering volumes external to the object, the method comprising the steps of:
   a) characterizing the flux scattered by the scattering volumes from each portion of the object to create a weighting function representing the total flux incident on a particular target-plane area element;
   b) sampling the portions of the object at unequal intervals, the intervals being selected to effect an implicit weighting of the samples corresponding to the weighting function created in step a);
   c) summing the implicitly weighted samples to create an approximation to a weighted integral;
   d) repeating steps a)–c) for each target-plane element to compute weighted integrals associated with a plurality of target-plane elements thereby to compute an image correction;
   e) employing the image correction thus obtained to remove from target-plane flux signals the contribution to such signals caused by scattered flux.

22. The method of claim 21, wherein the target plane comprises a plurality of smaller isoplanatic patches, and wherein such patches may be associated with different weighting functions.

23. The method of claim 22 wherein each isoplanatic patch has a sample pattern associated therewith.

24. The method of claim 22 wherein the size of each isoplanatic patch is associated with the spatial rate of change of the weighting function.

25. The method of claim 21 wherein the weighting function within each isoplanatic patch does not vary by more than a predetermined amount.

26. The method of claim 21, wherein the sample intervals of step b) for sampling the portions of the object at unequal intervals are obtained from an image pyramid.

27. An apparatus for correcting an image of an object, the image having a plurality of image elements and the image being corrupted by stray flux, to remove the effect of stray flux on the image, the apparatus comprising:
   a) an image memory having one or more partitions for storing an input image and a corrected image;
   b) an arithmetic logic unit for performing arithmetic computations;
   c) a plurality of look up tables for storing selected-ordinate image coordinate values;
   d) a controller for addressing the image memory and selecting lookup tables;
   where, in operation
   1) an image of the object is stored in the image memory;
   2) the controller selects an element of the image;
   3) the controller selects a lookup table, and a corresponding scale factor, appropriate to that image element, each lookup table containing information to generate a pattern of sample coordinates of the image of the object, the samples being at unequal intervals, the intervals being selected to effect an implicit weighting of the samples corresponding to a predetermined weighting function;

4) the controller steps through the lookup table and the arithmetic logic unit sums the implicitly weighted samples and multiplies them by the scaling factor to create an approximation to a weighted integral for that image element;

5) the weighted integral is stored in the image memory;

6) the controller selects a next element and steps 3)–5) are repeated to compute weighted integrals associated with each of the plurality of image elements, thereby to obtain a corrected image.

28. The apparatus of claim 27 wherein the weighted integral created in step 5) is subtracted from the image value and the resulting value is stored in the image memory.

29. A computer-readable medium containing instructions for providing program control for a computer controller to remove the effects of the spatial smearing on an image of an object, the image comprising one or more dimensions and having a plurality of image elements, by implementing the steps of:

a) sampling portions of the image of the object at unequal intervals, the intervals being selected to effect an implicit weighting of the samples corresponding to a predetermined weighting function;

b) summing the implicitly weighted samples to create an approximation to a weighted integral;

c) repeating steps a)–b) to compute weighted integrals associated with each of the plurality of image elements thereby to obtain a correction to the image.

* * * * *